Jan. 18, 1949.  R. C. CERRUTI  2,459,264
TRANSFER MECHANISM
Filed July 16, 1946
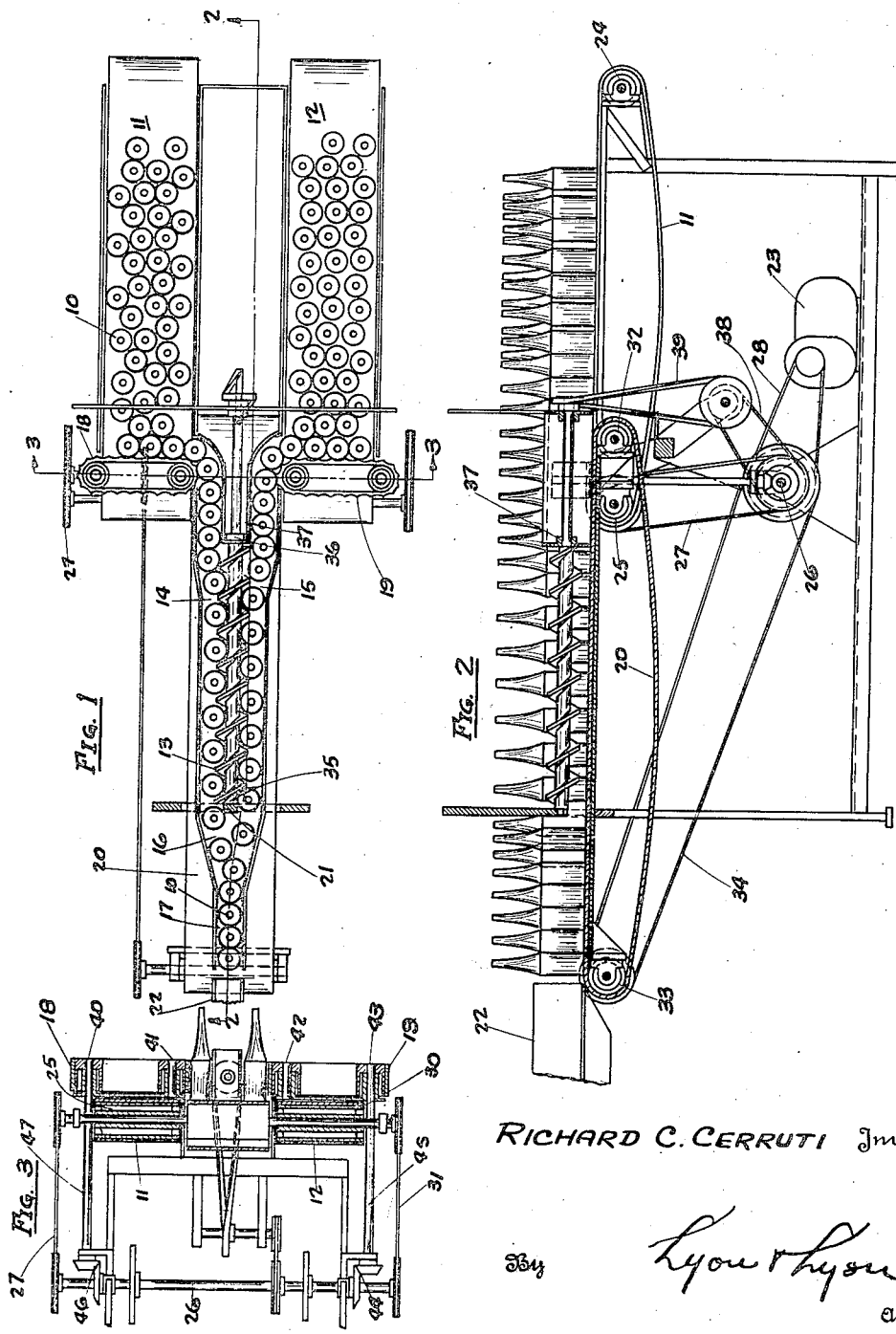
RICHARD C. CERRUTI Inventor
By Lyon & Lyon
Attorneys Patented Jan. 18, 1949

2,459,264

UNITED STATES PATENT OFFICE 2,459,264

TRANSFER MECHANISM

Richard C. Cerruti, Oakland, Calif., assignor to California Packing Corporation, San Francisco, Calif., a corporation of New York Application July 16, 1946, Serial No. 683,919

1 Claim. (Cl. 198—32)

The present invention relates to transfer mechanism and in particular to apparatus arranged to feed to a work center or the like a row of articles from a plurality of stations where such articles are indiscriminately placed.

In the packaging or bottling of food articles it is desirable from the standpoint of efficiency and economy to transfer bottles, containers and the like in bulk in an indiscriminate manner on a conveyer belt, loading platform or the like from where they are automatically arranged and transferred in predetermined fashion to a work center or loading center. In such case a minimum of manhours is required since a machine performs the required operations. Such a machine is desirably simple, of a minimum number of expensive parts and easily manufactured and repaired.

It is therefore an object of the present invention to provide an improved machine for arranging and transporting articles in predetermined fashion.

Another object of the present invention is to provide a simple screw construction which functions to automatically translate and arrange articles in predetermined fashion.

The features of the present invention which are believed to be novel are set forth with particularity in the appended claim. This invention itself, both as to its organization and manner of operation, together with further objects and advantages thereof, may best be understood by reference to the following description taken in connection with the accompanying drawings in which:

Figure 1 is a plan elevation of apparatus incorporating the present invention.

Figure 2 is a sectional view taken substantially on the lines 2—2 of Figure 1.

Figure 3 is a sectional view taken substantially on the lines 3—3 of Figure 1.

In the figures there is described a mechanism for transferring articles indiscriminately arranged at a plurality of loading zones to a work center or the like in single file. Although I have shown such articles to be bottles, it is evident that such articles may be cans or the like.

The bottles, each of which has a general reference number 10, are indiscriminately arranged on a pair of movable article loading platforms or endless belts 11, 12 arranged on opposite sides of the rotatable axis of a screw 13 which has a pitch slightly larger than the width or diameter of the individual articles 10. The screw 13 and endless belts 11, 12 are moved by means described later.

A plurality of article guideways 14, 15 each having a width slightly larger than the width of article 10, extends respectively from the platforms 11, 12 to and along side of screw 13 to the far end thereof where they converge at the space designated 16 to form a single guideway 17 having a width slightly greater than the width or diameter of the article 10.

Each one of the two endless belts 11, 12, is associated with a corresponding movable endless belt 18, 19 which moves in a direction transverse to the movement of belts 11, 12 in a direction toward the axis of screw 13, thereby to feed the article 10, moved into abutment with belts 18, 19 by movement of belts 11, 12, into the corresponding guideways 14, 15.

While the articles are in the guideways 14, 15 and 17 they rest and are moved by the endless belt 20 at a rate of speed substantially equal to the speed at which the article 10 would be moved if the belt 20 were maintained stationary and the screw 13 rotated at its normal speed.

The function of the screw 13 is primarily to ensure alternate feeding of articles 10 from the guideways 14, 15, that is, each second article in guideway 17 comes from guideway 15, while each second intermediate article 10 comes from guideway 14. For this purpose it is noted that the pitch of the spirals on screw 13 is just slightly greater than the width or diameter of article 10, in which case an article held in captive adjacent screw spiral and guideway 14 rest above, in Figure 1, adjacent articles held captive by the screw spiral and guideway 15. Further, stationary article abutment 21 arranged in proximity to screw 13 and on a prolongation of its axis assures the maintenance of such article spacing in the convergent guideway 16.

It is evident that articles 10 driven in the convergent guideway 16 due to movement of the belt 20 are cammed inwardly in the intermediate spaces to form a single file in the guideway 17.

The guideway 17 may extend to another guideway 22 which leads to a filling machine, work center or the like.

Each one of the movable elements described above is driven by a single prime mover 23, such as a motor, engine or the like. Movable platform or endless belt 11 passes over a pair of rotatably spaced pulleys 24, 25, the pulley 25 being coupled to the pulley shaft 26 by means of endless belt 27 and the pulley shaft 26 in turn being coupled to prime mover 23 by means of belt 28. In similar fashion, belt 12 is driven by prime mover 23 by means shown more clearly in Figure 3. Belt 12 is driven by pulley 30 which is coupled to the driving pulley shaft 26 through flexible belt 31. Likewise, the endless belt 20 mounted for movement on the rotatable pulley 32 is driven by the flexible belt 34 disposed between pulley 33 and driving shaft 26. Screw 13 having its opposite ends 35, 36 rotatably mounted on the stationary framework 37 is driven from the driving shaft 26 through the flexible belt 38 and twisted belt 39.

The auxiliary endless belts 18, 19, shown more clearly in Figures 1 and 3, are each mounted for rotation about the axis of their respective spaced pulleys 40, 41, and 42, 43. In one case, pulley 40 is driven from the driving shaft 26 through the bevel gear arrangement 46 and the rigid shaft 47, while in the other case the pulley 43 is driven from the driving shaft 26 through the bevel gear arrangement 44 and rigid shaft 45.

While I have shown and described one of the many ways in which the movable elements 11, 12, 18, 19, 20 and 13 may be driven, it is understood that the present invention is not limited to the specified drive means shown.

While the particular embodiments of the present invention have been shown and described, it will be obvious to those skilled in the art that changes and modifications may be made without departing from this invention in its broader aspects, and, therefore, the aim in the appended claim is to cover all such changes and modifications as fall within the true spirit and scope of this invention.

I claim:

In a mechanism for transferring articles, a rotatable screw having a pitch larger than the width of said articles, a pair of movable article loading platforms arranged on opposite sides of the rotatable axis of said screw and movable in a direction substantially parallel thereto, an article guideway slightly larger than the width of said article extending from each of said platforms to and along side of said screw, auxiliary article moving means associated with each one of said platforms arranged to move articles transported thereon into the corresponding guideway, each of said guideways converging at one end of said screw to form a single guideway having a width slightly larger than the width of said article, stationary article abutment means arranged in proximity to said screw and on a prolongation of its axis, and article moving means arranged to move said articles when in said guideways.

RICHARD C. CERRUTI.

REFERENCES CITED

The following references are of record in the file of this patent:

UNITED STATES PATENTS

| Number | Name | Date |
| --- | --- | --- |
| 2,108,522 | Bergmann | Feb. 15, 1938 |
| 2,200,228 | Simmons | May 7, 1940 |